US010021967B2

(12) United States Patent
Goldman

(10) Patent No.: US 10,021,967 B2
(45) Date of Patent: *Jul. 17, 2018

(54) DEVICE AND METHOD FOR EXTENDING A COUNTERTOP

(71) Applicant: Pam Goldman, New York, NY (US)

(72) Inventor: Pam Goldman, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/625,119

(22) Filed: Jun. 16, 2017

(65) Prior Publication Data
US 2017/0325578 A1    Nov. 16, 2017

Related U.S. Application Data

(63) Continuation-in-part of application No. 15/234,271, filed on Aug. 11, 2016, now Pat. No. 9,681,745.

(60) Provisional application No. 62/207,807, filed on Aug. 20, 2015.

(51) Int. Cl.
| A47B 1/04 | (2006.01) |
| F16B 11/00 | (2006.01) |
| A47B 13/16 | (2006.01) |
| A47B 23/04 | (2006.01) |
| A47B 13/08 | (2006.01) |
| A47B 17/03 | (2006.01) |
| A47B 21/03 | (2006.01) |
| A47B 97/00 | (2006.01) |

(52) U.S. Cl.
CPC .............. *A47B 1/04* (2013.01); *A47B 13/08* (2013.01); *A47B 13/16* (2013.01); *A47B 17/033* (2013.01); *A47B 23/042* (2013.01); *F16B 11/006* (2013.01); *A47B 21/03* (2013.01); *A47B 97/00* (2013.01)

(58) Field of Classification Search
CPC .... A47B 1/00; A47B 1/04; A47B 1/08; A47B 13/08; A47B 17/03; A47B 21/03; A47B 97/00
USPC ................................. 108/65, 69, 90, 152, 26
See application file for complete search history.

(56) References Cited

U.S. PATENT DOCUMENTS

| 1,048,596 | A | * | 12/1912 | Sedaj | ...................... A47B 1/04 108/69 |
| 1,472,129 | A | * | 10/1923 | Meixell | ................... A47B 57/00 108/69 |
| 2,472,676 | A | * | 6/1949 | Nunnally, Sr. | ........ D06F 81/003 108/69 |
| 2,664,005 | A | * | 12/1953 | Kosinski | .................. A47J 47/16 126/221 |
| 2,942,921 | A | * | 6/1960 | Rachman | ............. A47B 3/0916 108/26 |
| 2,955,888 | A | * | 10/1960 | Graves | ................... A47B 1/056 108/69 |
| 3,282,437 | A | * | 11/1966 | Hansen | ................. A47F 7/0064 211/41.7 |
| 3,337,109 | A | * | 8/1967 | Shumrak | ............ A47G 23/0216 220/738 |
| 3,460,795 | A | * | 8/1969 | Dahlin | ................. A47B 23/044 248/452 |

(Continued)

*Primary Examiner* — Jose V Chen
(74) *Attorney, Agent, or Firm* — Thomas A. O'Rourke; Bodner & O'Rourke, LLP

(57) ABSTRACT

A portable detachable counter extension system uniquely mounts on top of an already existing surface including but not limited to a counter, bookshelf, radiator cover, bathroom vanity or any other suitable existing suitable surface.

16 Claims, 13 Drawing Sheets

(56) References Cited

U.S. PATENT DOCUMENTS

| | | | | |
|---|---|---|---|---|
| 3,627,182 A * | 12/1971 | Calkins | ................ | B43K 23/001 224/183 |
| 4,850,477 A * | 7/1989 | Gelardi | .............. | G11B 33/0455 206/308.2 |
| 6,354,658 B1 * | 3/2002 | Sher | ........................ | A47C 7/68 248/918 |
| 6,491,194 B2 * | 12/2002 | Marvin | ............... | B60R 11/0241 224/247 |
| 7,862,111 B2 * | 1/2011 | Steenson | .................. | A47C 7/70 108/157.1 |
| 8,079,553 B1 * | 12/2011 | Martin | ..................... | A47C 7/70 108/135 |
| 9,681,745 B2 * | 6/2017 | Goldman | ................. | A47B 1/04 |
| 2006/0102056 A1 * | 5/2006 | Wolfe | ...................... | A47B 1/04 108/65 |
| 2008/0029663 A1 * | 2/2008 | Derry | ................ | A47B 21/0314 248/178.1 |
| 2009/0009936 A1 * | 1/2009 | Neu | ..................... | H04B 1/3877 361/679.01 |
| 2010/0171465 A1 * | 7/2010 | Seal | ................... | G03G 15/5004 320/114 |
| 2012/0175474 A1 * | 7/2012 | Barnard | ............... | F16M 11/041 248/122.1 |

* cited by examiner

SECTION B-B

A

DEVICE AND METHOD FOR EXTENDING A COUNTERTOP

This application is a continuation in part of U.S. application Ser. No. 15/234,271 filed Aug. 11, 2016 which claims priority on U.S. Provisional application Ser. No. 62/207,807 filed Aug. 20, 2015, the disclosures of which are incorporated herein by reference

STATEMENT REGARDING FEDERALLY SPONSORED RESEARCH

NA

FIELD OF THE INVENTION

The present invention relates to devices and methods for providing a countertop extension.

BACKGROUND OF THE INVENTION

Counter space is a valuable commodity. Counter space is used for a seemingly endless variety of uses including eating, working, preparing food and the like. A lack of counter space, especially in circumstances wherein the overall space is limited, can be a serious problem. This is particularly notable in small apartments (many with narrow so-called 'galley' kitchens), mobile homes, recreational vehicles, boats, dormitories, nursing homes, assisted living facilities, medical and dental offices and the like. Extended counter space also offers accessibility for the disabled and elderly, providing extra room to accommodate wheelchairs and walkers.

SUMMARY OF THE INVENTION

As specified in the Background Section, above, there is a need in the art for devices and methods that provide additional counter space easily and affordably.

Thus, in one aspect, the present invention provides a portable detachable counter extension system that uniquely mounts on top of an already existing surface including but not limited to a counter, bookshelf, radiator cover, bathroom vanity or any other suitable existing suitable surface. The countertop extension portion further comprising a substantially flat surface or 'tray' and at least two extension arms, the extension arms each further comprising a terminal end wherein the terminal end further comprises a first quick release connector mechanism and at least 2 anchor portions, which also may be components of a single mounting strip with industrial strength adhesive on its underside, protected by peel-off tape, which remains affixed to the existing counter or other suitable surface, for connection to an existing countertop or other suitable surface and further comprising a second quick release connector mechanism wherein the first quick release connector mechanism and the second quick release connector mechanism join to reversibly detach the countertop extension portion from the mounting strip and therefore from the existing countertop or other suitable surface.

In another embodiment the present invention is a method for providing additional counter space comprising the steps of affixing at least 2 quick release anchor portions to an existing countertop or other suitable surface, and attaching to the quick release anchor portions a countertop extension portion thereby providing additional counter space as needed.

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" mean all of the following possible combinations: A alone; or B alone; or C alone; or A and B together; or A and C together; or B and C together; or A, B and C together.

Furthermore, the described features, advantages, and characteristics of any particular embodiment disclosed herein, may be combined in any suitable manner with any of the other embodiments disclosed herein.

The present invention provides systems and methods for providing additional counter space where needed.

FIG. 1 shows an embodiment of the invention of the present disclosure. In this embodiment a countertop extension portion is provided that reversibly attaches to an existing countertop or other suitable surface by way of the provided anchor portions. The countertop extension portion comprises a substantially flat surface and at least 2 extension arms. The substantially flat surface may be made from any suitable materials known to those having skill in the art including but not limited to plastic, glass, wood, and metal. The extension arms are attached to the substantially flat portion, in some embodiments on or about the edges of the substantially flat portion. In some embodiments the extension arms are of an adjustable length. The extension arms may be made of any suitable material known to those having skill in the art, in this example, aluminum. The anchor portions are affixed to an existing countertop or other suitable structure by any attachment mechanism known to those having skill in the art, in this case with 3M industrial strength adhesive applied to the underside of a mounting strip, the adhesive being covered by protective peel-off tape or with screws if the existing suitable surface can accommodate them. The anchor portions further comprise a quick release mechanism allowing the reversible connection to the extension arms. In this embodiment, the terminal ends of the extension arms fit within a cavity in the anchor portions and lock in place by way of a groove on the upper inside surface of the anchor portion engaging with a raised portion on the terminal end of the extension arms.

FIG. 2(a) shows additional various views of an exemplary embodiment of anchor portions used in the systems of the present disclosure.

Figure 4:
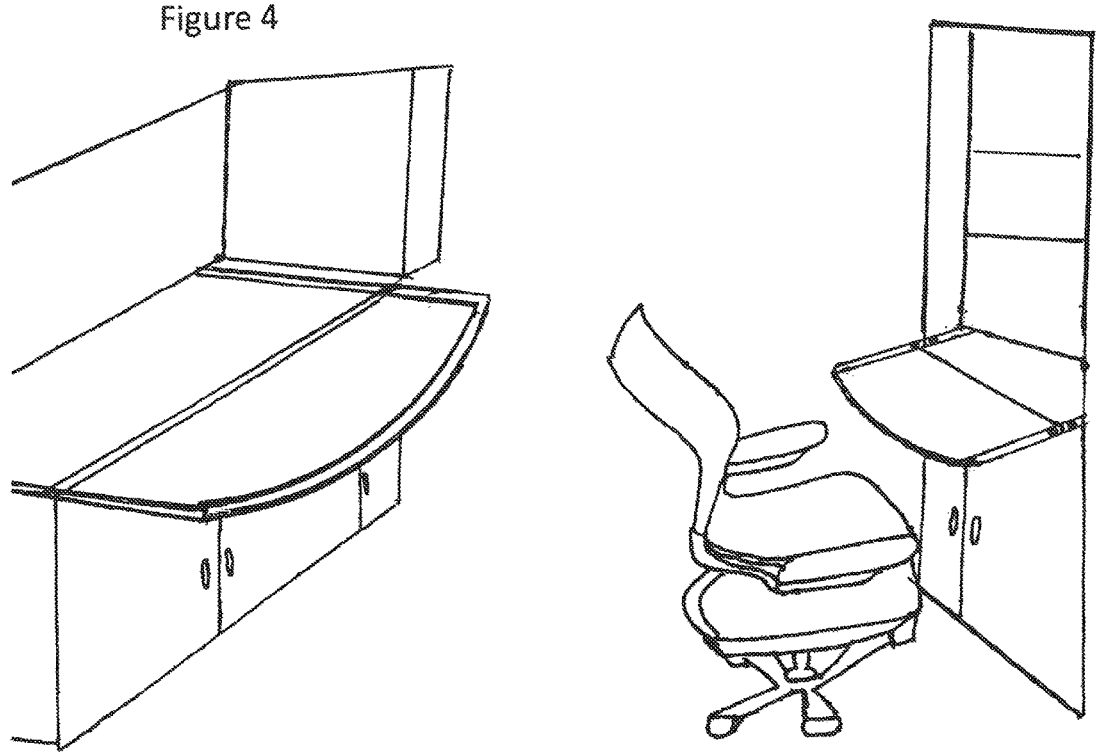
Figure 4:
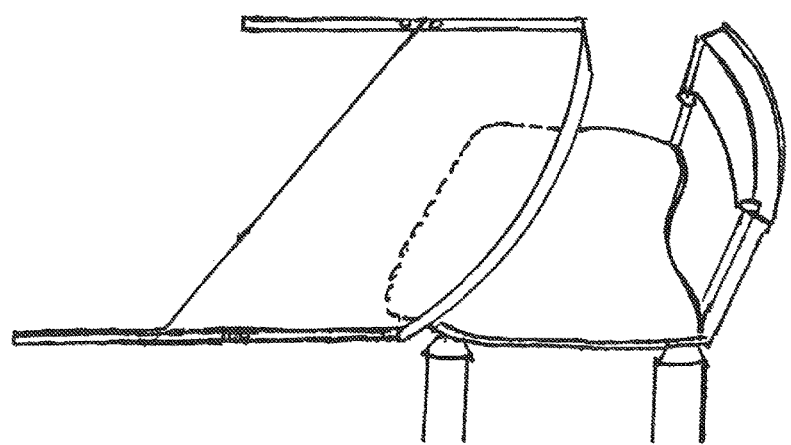

FIG. 4 demonstrates the use of the countertop extension system to provide additional counter space where and when needed.

Figure 5:
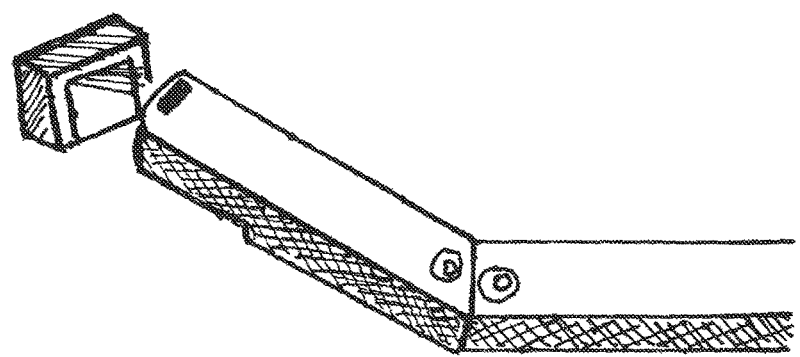
Figure 5:
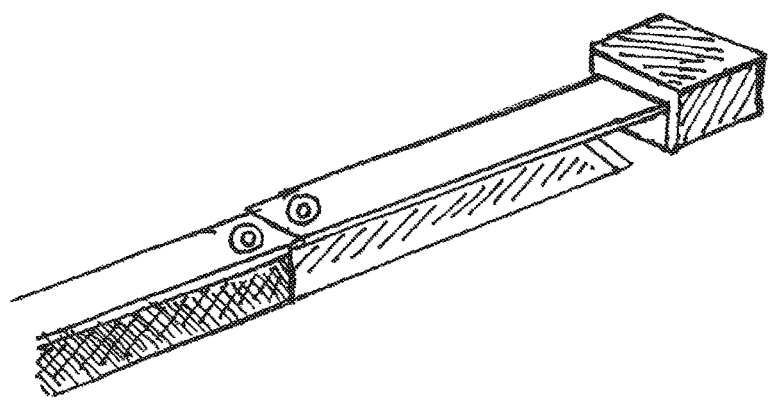

FIG. 5 shows a detailed view of the extension arms engaging with the anchor portions to temporarily affix the countertop extension portion to an existing countertop or other suitable structure.

Figure 6:
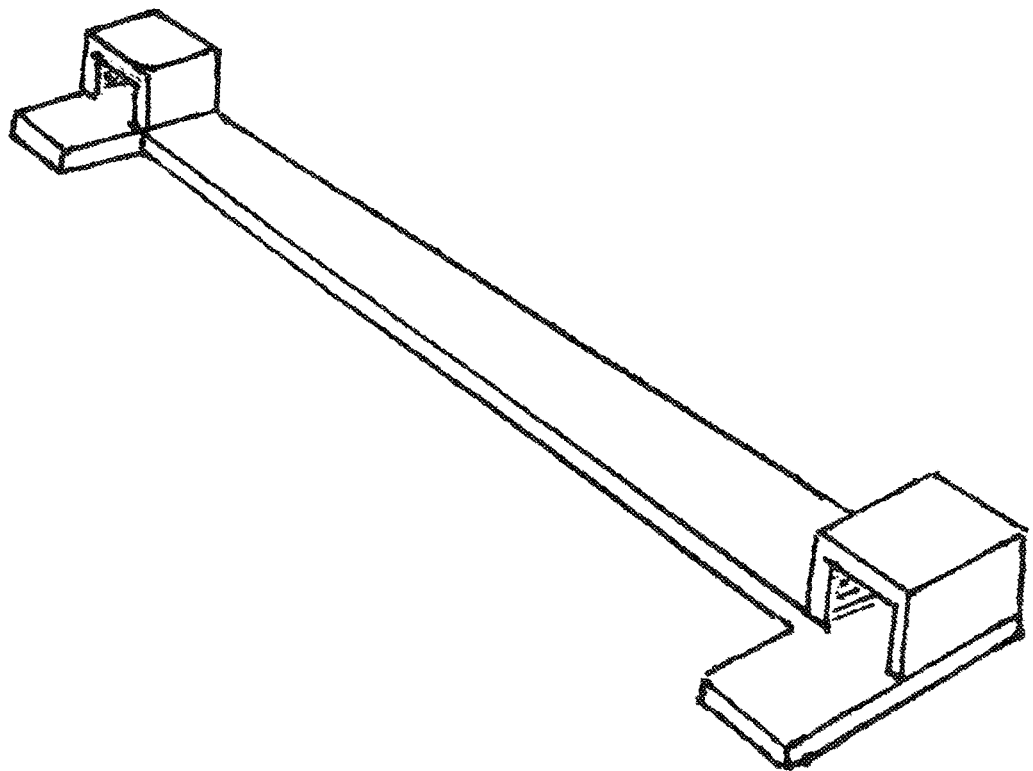

FIG. 6 shows a one piece mounting strip including two raised anchor portions or 'cubes', each containing a cavity with a groove on the upper inside surface to engage with a raised portion on the terminal end of the extension arms which secure and lock in place the extension arms and thus, the attached tray. To disengage and unlock press down on extension arms, slide extensions away from mounting strip. The base or strip has an industrial strength adhesive covered with a peel-off protective tape to be removed before affixing to existing suitable surface space.

Figure 1:
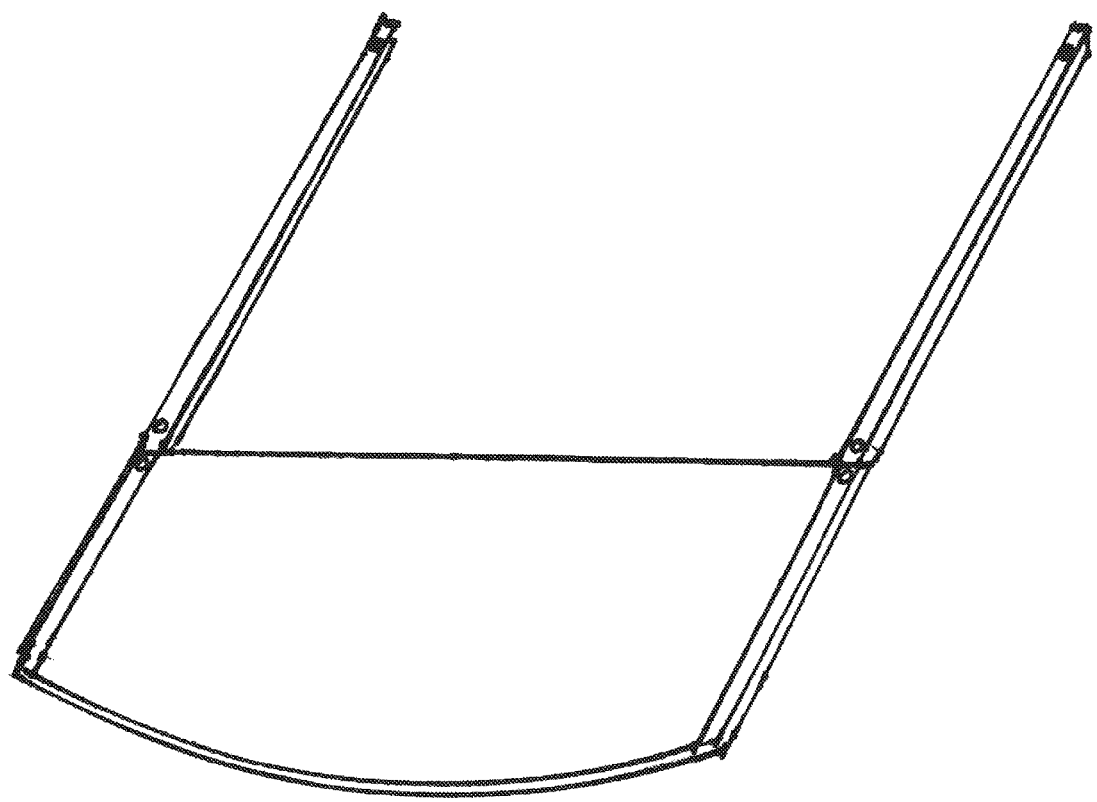
Figure 2:
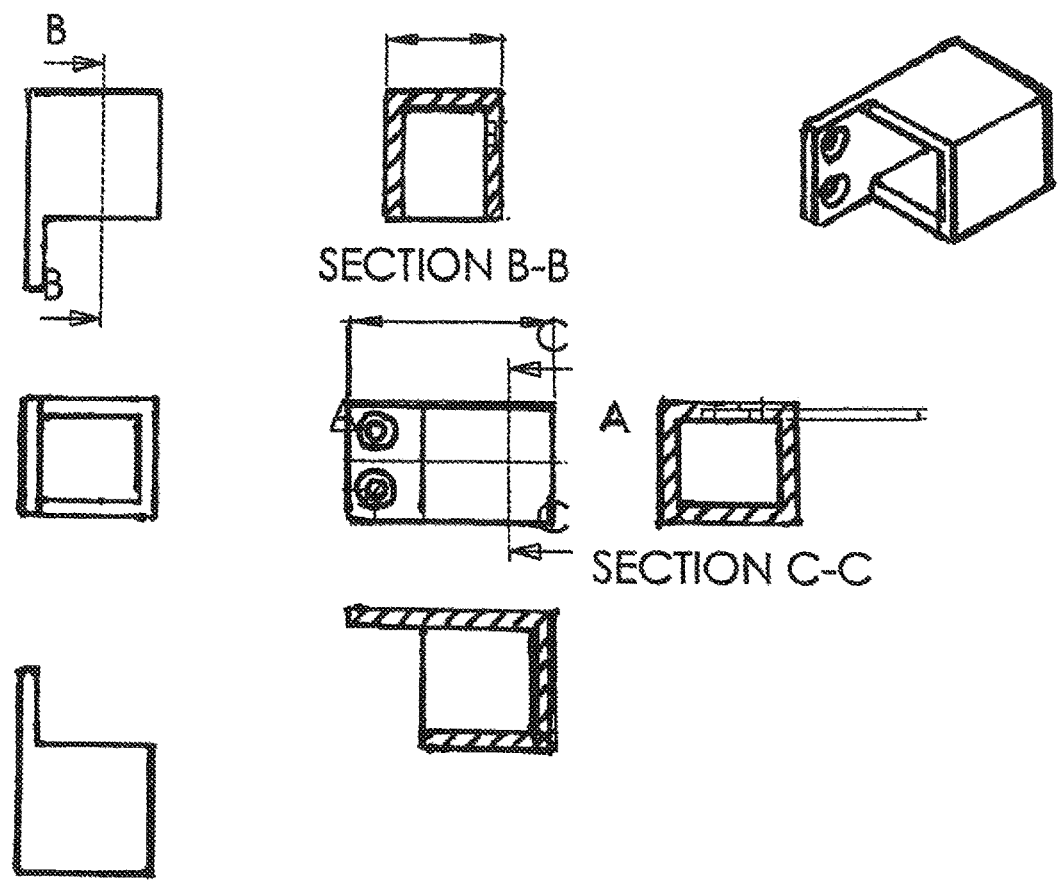
FIG. 2 shows various views of an exemplary embodiment of anchor portions used in the systems of the present disclosure.
Figure 2:
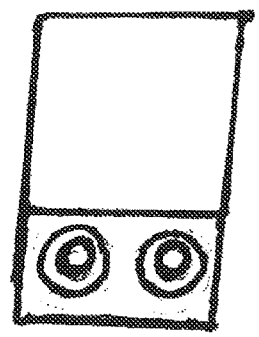
Figure 2:
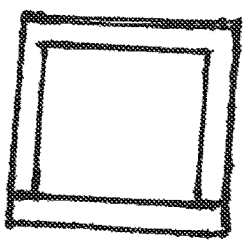
Figure 2:
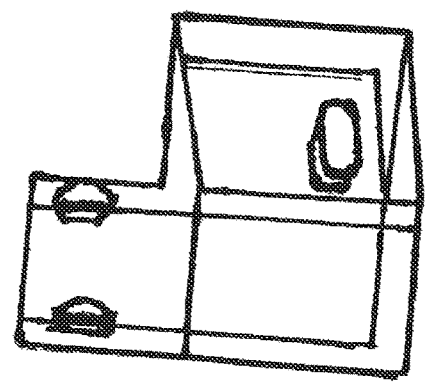
Figure 3:
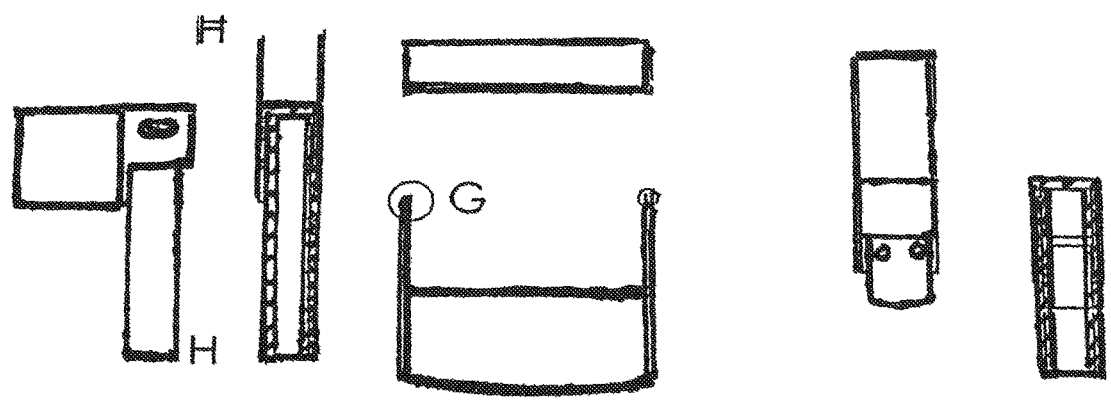
FIG. 3 shows various views of an exemplary countertop extension portion used in the systems of the present disclosure.
Figure 7:
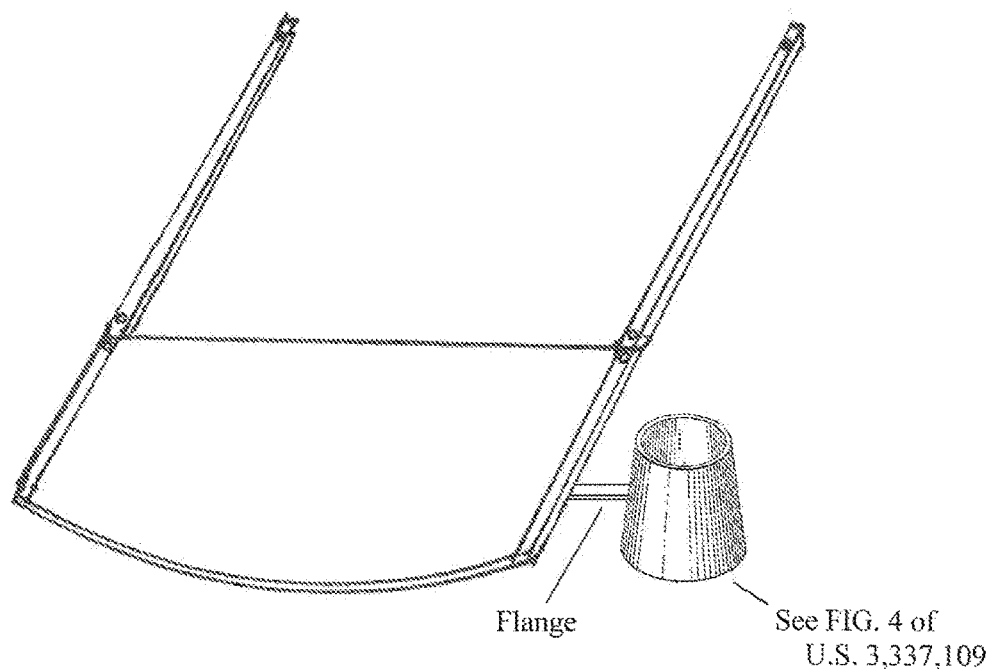

FIG. 7 shows the container holder of U.S. Pat. No. 3,337,109 to Shumrak with a connecting flange to the tray of FIG. 1.

Figure 8:
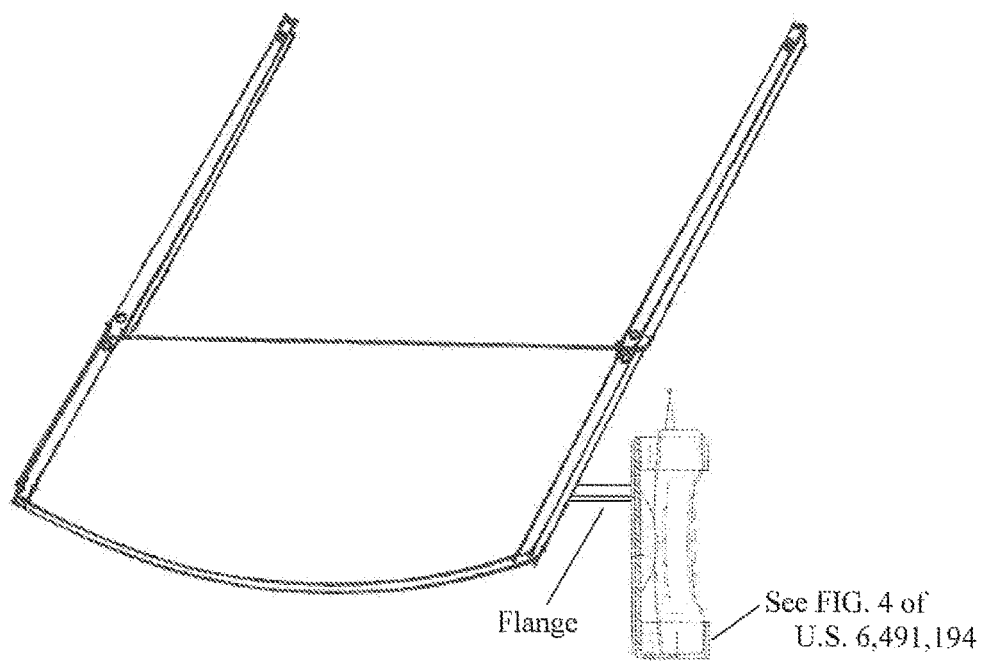

FIG. 8 shows the cell phone holder of U.S. Pat. No. 6,491,194 to Marvin with a connecting flange to the tray of FIG. 1.

Figure 9:
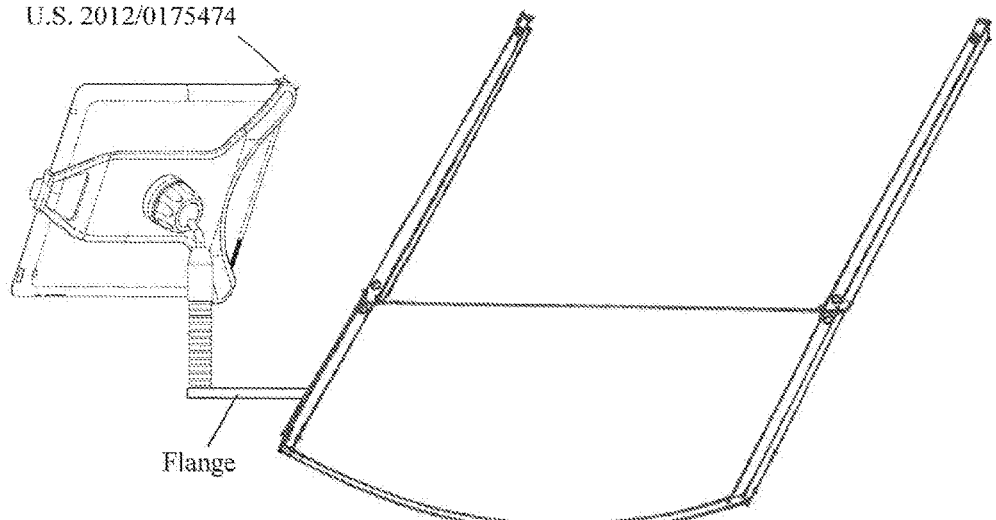

FIG. 9 shows the electronic device holder (e.g., iPad holder) of U.S. Patent App. Pub. No. 2012/0175474 to Barnard with a connecting flange to the tray of FIG. 1.

Figure 10:
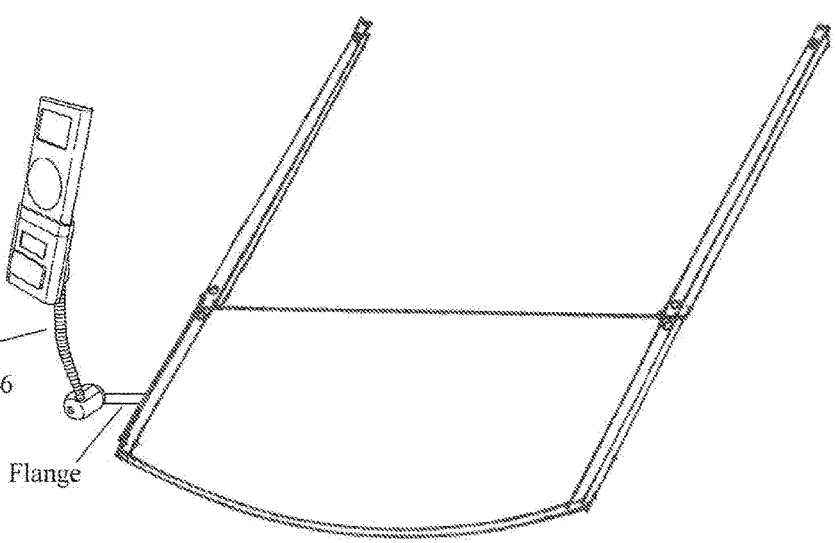

FIG. 10 shows the holder for electronic devices (e.g., iPod holder) of U.S. Patent App. Pub. No. 2009/0009936 to Neu with a connecting flange to the tray of FIG. 1.

Figure 11:
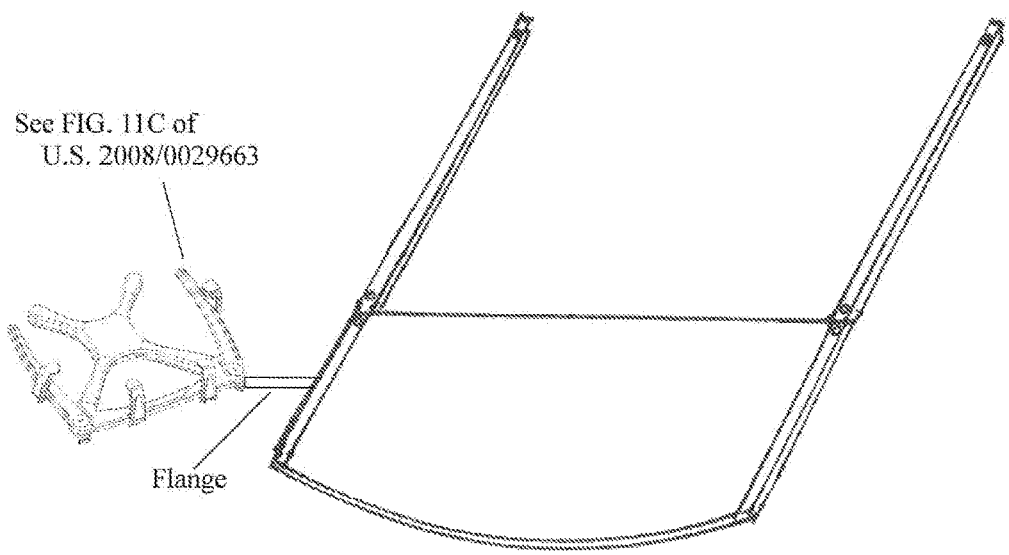

FIG. 11 shows the laptop holder of U.S. Patent App. Pub. No. 2008/0029663 to Derry with a connecting flange to the tray of FIG. 1.

Figure 12:
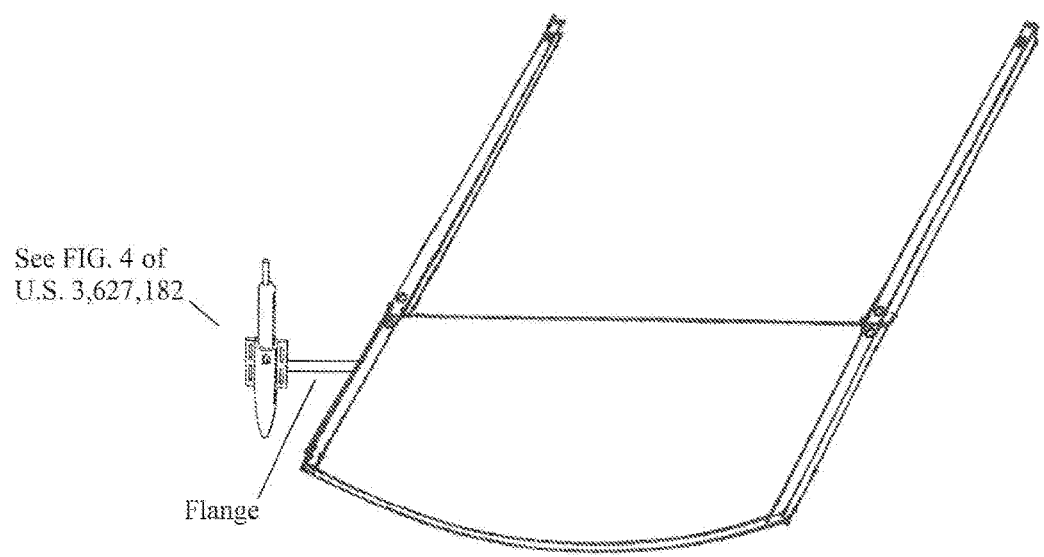

FIG. 12 shows the pen holder attachment device of U.S. Pat. No. 3,627,182 to Calkins with a connecting flange to the tray of FIG. 1.

Figure 13:
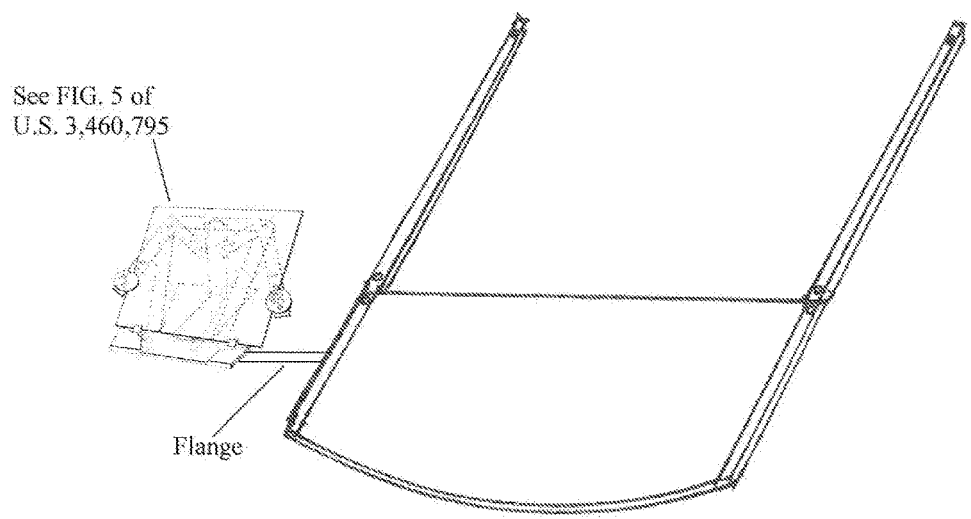

FIG. 13 shows the hook holder of U.S. Pat. No. 3,460,795 to Dahlin with a connecting flange to the tray of FIG. 1.

Figure 14:
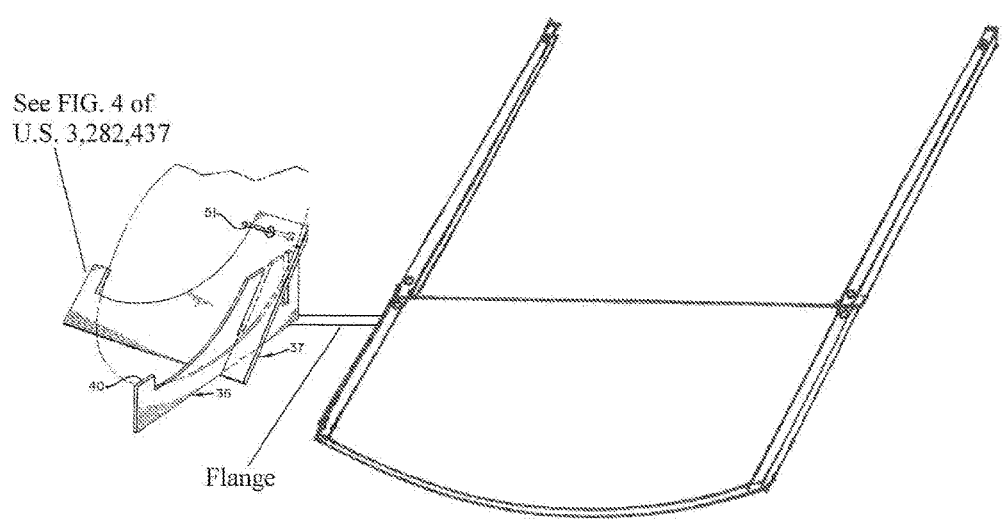

FIG. 14 shows the display holder (e.g., dish holder) of U.S. Pat. No. 3,282,437 to Hansen with a connecting flange to the tray of FIG. 1.

Figure 15:
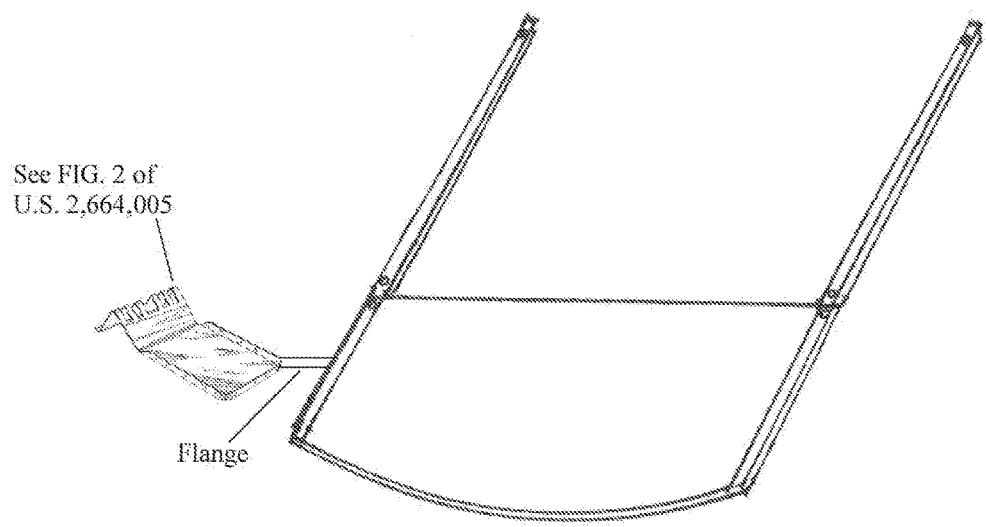

FIG. 15 shows the utensil holder of U.S. Pat. No. 2,664,005 to Kosinski with a connecting flange to the tray of FIG. 1.

Figure 16:
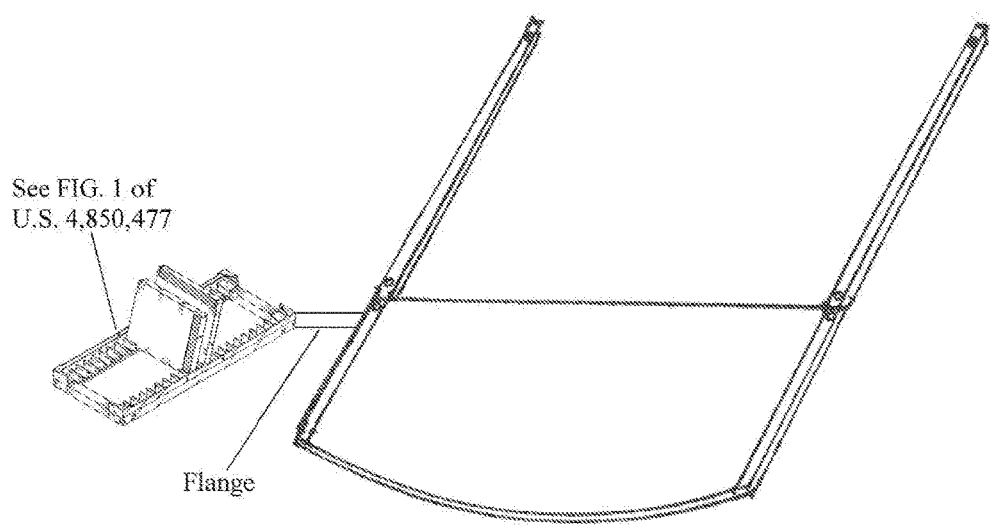

FIG. 16 shows the file holder of U.S. Pat. No. 4,850,477 to Gelardi with a connecting flange to the tray of FIG. 1.

Figure 17:
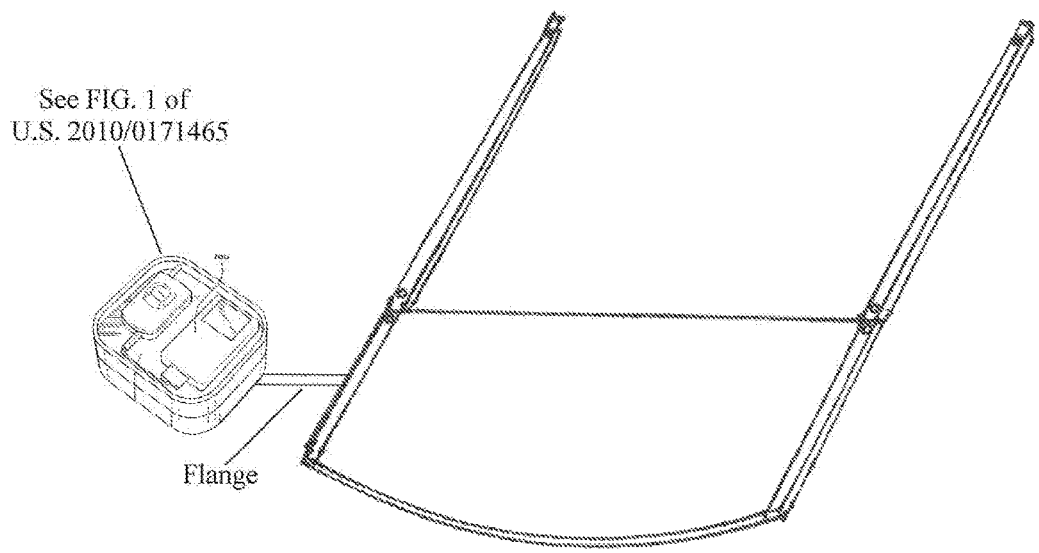

FIG. 17 shows the charger station of U.S. Patent. App. Pub. No. 2010/0171465 to Seal with a connect flange to the tray of FIG. 1.

The countertop extension product described herein and known as "CounterFit" includes, but should not be limited to the drawings (e.g., FIG. 6) that describes said product. Other configurations are envisioned. The mounting strip, consisting of a single continuous piece with two end terminals, one on either end of said mounting strip, can be modified to provide the same utility with a variety of options. Those options include but are not limited to:

(1) The two end terminals as they appear in the drawing (FIG. 6) minus the extension from each of them at their forefront.

(2) The two end terminals providing the same utility minus the mounting strip that connects them, i.e., as two separate end terminals with their undersides having industrial strength epoxy and protective peel-off tape for adhesion to
an existing suitable flat surface.

(3) A mounting strip with end terminals that have appropriately drilled holes for securement to an existing suitable surface with appropriately sized screws.

(4) Two separate end terminals (minus a connecting strip) with appropriately Drilled holes for adhering to an existing suitable surface with appropriately sized screws.

(5) First and second terminals (anchor members) for each of the arms of the countertop extension portion, with the first and second terminals being in line to respectively support the arms.

Accessories may also be added to the tray and/or any one or more of the anchor members, as supported by the following patents, etc., whose features may be incorporated herein, and which may merely require an additional flange member to provide connectivity:

Cup holder (U.S. Pat. No. 3,337,109 to Shumrak);
Cell phone holder (U.S. Pat. No. 6,491,194 to Marvin);
Ipad holder (U.S. Patent Pub. No. 2012/0175474 to Barnard);
Ipod holder (U.S. Patent Pub. No. 2009/0009936 to Neu);
Laptop holder (U.S. Patent Pub. No. 2008/0029663 to Derry);
Pen/pencil holder (U.S. Pat. No. 3,627,182 to Calkins);
Book holder (U.S. Pat. No. 3,460,795 to Dahlin);
Hooks
Plate holder (U.S. Pat. No. 3,282,437 to Hansen);
Utensil holder (U.S. Pat. No. 2,664,005 to Kosinski);
File holder (U.S. Pat. No. 4,850,477 to Gelardi); and
Charger station (U.S. Patent Pub. No. 2010/0171465 to Seal).

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

All references cited herein, including all patents, published patent applications, and published scientific articles, are incorporated by reference in their entireties for all purposes.

What is claimed is:

1. A portable detachable counter extension system configured for attachment to an existing countertop, said portable detachable counter extension system comprising:

a countertop extension portion, the countertop extension portion comprising a substantially flat surface, and a first extension arm and a second extension arm, the two extension arms each comprising a terminal end;

a first anchor member, said first anchor member comprising:

a first mounting strip portion;

one or more walls extending from said first mounting strip portion to form an opening therebetween, said opening configured to slidably receive said first extension arm of said countertop extension portion therethrough; and wherein at least a portion of said first mounting strip portion extends beyond said one or more walls;

a second anchor member, said second anchor member comprising:

a second mounting strip portion;

one or more walls extending from said second mounting strip portion to form an opening therebetween, said opening between said second mounting strip portion and corresponding one or more walls configured to slidably receive said second extension arm of said countertop extension portion therethrough;

wherein at least a portion of said second mounting strip portion extends beyond said one or more walls that extend from said second mounting strip portion; and industrial strength adhesive applied to each of said first mounting strip portion of said first anchor member, and said second mounting strip portion of said second anchor member.

2. The portable detachable counter extension system according to claim 1, further comprising a peel-off protective strip positioned over said industrial strength adhesive, and configured to be removed therefrom prior to affixing said anchor portion to the existing countertop with said industrial strength adhesive.

3. The portable detachable counter extension system according to claim 2,
further comprising a raised portion on said terminal end of said first extension arm; and
wherein said first mounting strip portion and corresponding one or more walls comprise a groove on an inside surface of the opening formed therebetween, said groove configured to receive said raised portion on said terminal end of said first extension arm.

4. The portable detachable counter extension system according to claim 3,
further comprising a raised portion on said terminal end of said second extension arm; and
wherein said second mounting strip portion and corresponding one or more walls comprise a groove on an inside surface of the opening formed therebetween, said groove configured to receive said raised portion on said terminal end of said second extension arm.

5. The portable detachable counter extension system according to claim 1, further comprising means for supporting a cup.

6. The portable detachable counter extension system according to claim 1, further comprising means for supporting a phone.

7. The portable detachable counter extension system according to claim 1, further comprising means for supporting an iPad.

8. The portable detachable counter extension system according to claim 1, further comprising means for supporting an iPod.

9. The portable detachable counter extension system according to claim 1, further comprising means for supporting a laptop computer.

10. The portable detachable counter extension system according to claim 1, further comprising means for supporting a pencil.

11. The portable detachable counter extension system according to claim 1, further comprising means for supporting a pen.

12. The portable detachable counter extension system according to claim 1, further comprising means for supporting a book.

13. The portable detachable counter extension system according to claim 1, further comprising means for supporting a plate.

14. The portable detachable counter extension system according to claim 1, further comprising means for supporting eating utensils.

15. The portable detachable counter extension system according to claim 1, further comprising means for supporting a file holder.

16. The portable detachable counter extension system according to claim 1, further comprising means for supporting a charging station.

* * * * *